2 Sheets—Sheet 1.

J. PETRIE, Jr.
Machine for Washing Wool, &c.

No. 218,770.      Patented Aug. 19, 1879.

Witnesses.             Inventor.
Pliny Nickerson      John Petrie Jr.
W. E. Chaffee        H. Curtis. Atty.

J. PETRIE, Jr.
Machine for Washing Wool, &c.
No. 218,770.  Patented Aug. 19, 1879.
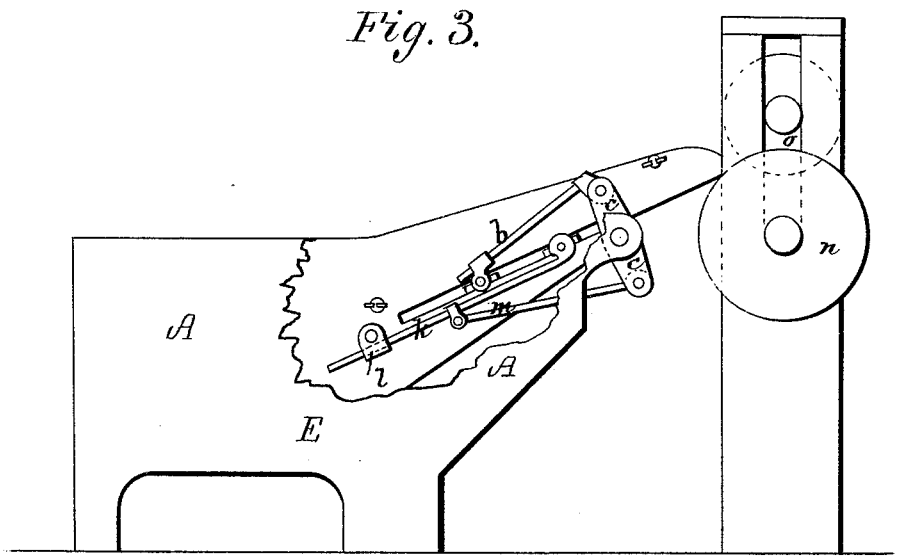
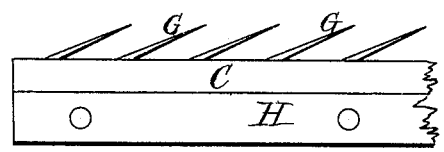
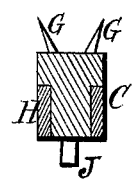
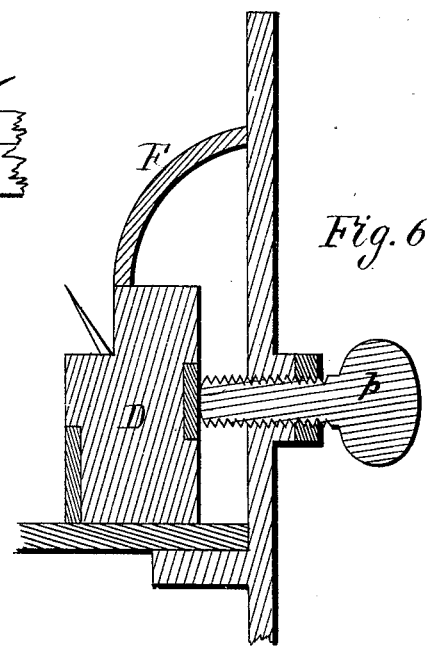

UNITED STATES PATENT OFFICE.

JOHN PETRIE, JR., OF ROCHDALE, COUNTY OF LANCASTER, ENGLAND.

IMPROVEMENT IN MACHINES FOR WASHING WOOL, &c.

Specification forming part of Letters Patent No. 218,770, dated August 19, 1879; application filed October 14, 1878.

*To all whom it may concern:*

Be it known that I, JOHN PETRIE, Jr., of Rochdale, in the county of Lancaster, England, have invented certain new and useful Improvements in Machinery for Washing Wool or other Fibrous Material, of which the following is a specification.

This invention relates to improvements in that class of machiney for washing wool or other fibrous material in which the materials to be cleansed are placed upon a feed-apron, by which they are delivered into a vat or other receptacle and are agitated therein, being at the same time continuously carried forward to the opposite or delivery end of the said vat, from whence they are lifted out of the fluid by my devices, in order that they may be conducted to and introduced between a pair of squeezing-rollers or other mechanism.

Figure 1:
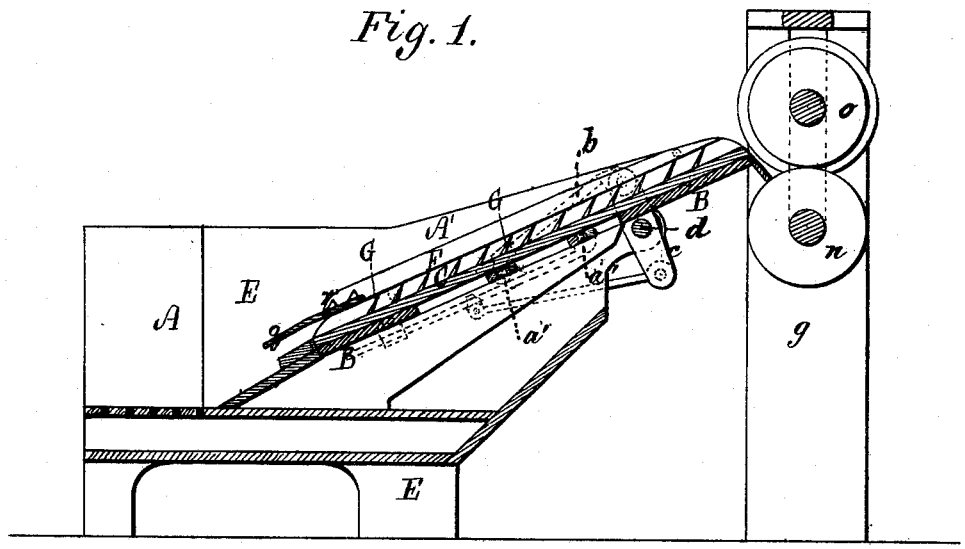
Figure 2:
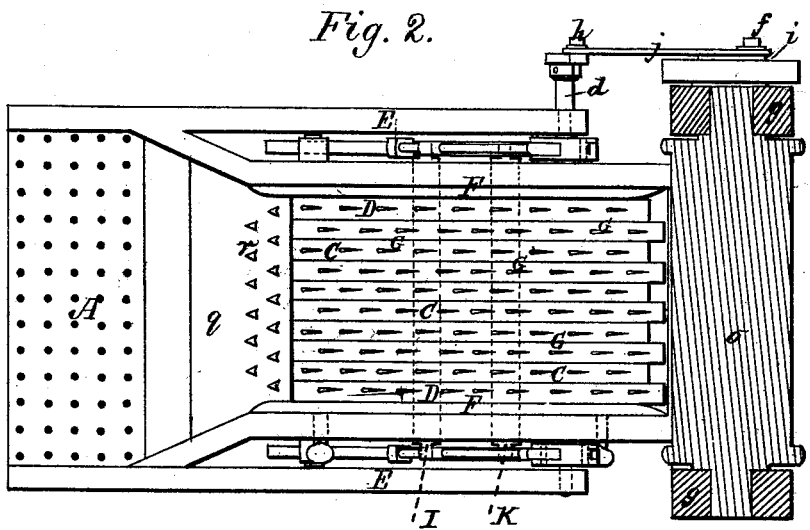

The drawings accompanying this specification represent, in Figure 1, a vertical section, and in Fig. 2 a plan, of a machine embracing my improvements. Figs. 3, 4, 5, and 6 are detailed views of parts of the machine, to be hereinafter alluded to.

In these said drawings, A represents the trough of any ordinary machine for washing or scouring wool or other analogous fibrous substances, it being understood that such trough is to be provided with rakes or other appliances in common use (but which are not represented in the drawings) for agitating the material and conveying it to the end of the trough next adjacent to the devices which lift and convey it from the trough to the squeeze-rollers.

In carrying out my invention I dispose within the end of the trough or chute A transverse beams B B, placed one higher than the other, in order to provide inclined ways or supports for a series of slide-bars, C C, &c., which are laid upon them, these bars C C, &c., being arranged in parallelism, side by side, and between stationary bars D D, secured to the inner sides of housings E E, which, in concert with the guards F F, constitute the sides of the portion or continuation of the trough A which contains my mechanism, and of which the supports B are practically the bottom.

Each slide-bar C is armed with a series of sloping spurs or pointed spikes, G G, &c., which take into the material to be raised, and each bar C is protected on each side against wear by a plate or shoe, H, of metal.

For effecting the requisite reciprocating sliding movements or traverses of the feed-bars C to and fro of the chute A', I employ two slotted bars or rails, I K, and from the bottom of each slide-bar depends a spur or tooth, J, which extends into one of the slots $a'$ of such rails, the rails I K being placed a short distance apart, and the arrangement of the spurs J being such that those entering one rail alternate with those operating with the other rail, in order that each alternate feed-bar C shall slide independently of and in a reverse direction to its neighbor.

To effect the requisite movements of the rails I K bodily to and fro, I pivot each end of the lowermost one, I, to the extremity of a rod, $b$, which is disposed inside of each housing E, and pivoted at its opposite end to one end of a double crank, $c$, which crank in turn is fixed at its center to a horizontal rock-shaft, $d$, mounted in the side standards of the machine-frame, and receiving rocking motions from a drive-shaft, $f$, which is mounted in upright slotted standards $g\ g$, erected upon the floor of the apartment in which the machine is situated, or upon the foundation or bed of the machine, whatever it may be, and immediately adjacent to the outer ends of the housings E, the connection between the rock-shaft $d$ and drive-shaft $f$ being a crank, $h$, affixed to the former, and a crank or wheel, $i$, affixed to the latter, with an intermediate rod, $j$. The mechanism last explained effects the movements of one rail and set of feed-bars, and to effect the movements of the others I connect each end of the uppermost rail, K, to the upper end of a sliding rail or rod, $k$, which is disposed upon the inside of each housing E and plays in guides $l$, affixed thereto, while to each rod $k$, I pivot one end of a connecting-rod, $m$, the opposite end of which is pivoted to the lower end of one of the cranks $c\ c$, before named.

The drive-shaft $f$ is the axis of the lower squeeze-roller, which is shown at $n$, while the upper roller, which is shown at $o$, is supported at its journals in the slots of the standards $g\ g$.

Rotary movements of the drive-shaft $f$ impart, through the cranks $c$ and $h$ and rod $j$, rocking motions to the shaft $d$, and these rocking motions of the shaft $d$ impart, through the agency of the intermediate mechanism before described, reciprocating movements in alternate opposite directions, and at alternating periods of time, to the rails I and K, and consequently to the feed-bars C C, &c.

As each feed-bar of one alternate series ascends the inclined plane or face of the chute the spikes with which it is armed take into the wool or other material and convey it upward and forward to the squeeze-rollers, while the bars of the other alternate series are at the time descending the inclined plane into a position to seize and act upon the material in their turn, the spikes of the last-named bars in their descent slipping under the material and offering no obstruction to its ascent. It will thus be seen that each series of feed-bars are constantly traversing the ways B B at alternating periods of time; consequently the material is fed forward to the squeeze-rolls without cessation. This relative movement, however, of the bars C may be varied, if desired—as, for instance, two or more adjacent bars may move in unison alternately with two or more bars moving in unison; or every alternate bar may be stationary, while the others reciprocate, as I do not restrict myself to any arbitrary method in this respect.

I prefer to make each feed-bar C of wood, shod with metal, as shown in Figs. 3 and 4 of the drawings; but this construction may be varied with circumstances.

To set or arrange the bars C—that is, to prevent looseness or misplacement—I employ a set-screw, $p$, which is screwed through the housing E and against the stationary side bars, D D, as shown in Fig. 6 of the drawings, which is a cross-section of the parts.

In order to prevent the material to be cleansed from slipping back to the trough A while it is being brought up to the bars C, I employ a plate, $q$, which spans the trough over the lower ends of the feed-bars, and is secured at its ends to the housings E E, and is furnished on its upper surface with bristling teeth $r\ r$, &c., which seize the material. By means of this toothed plate and its effect upon the material the act of removing the latter is facilitated, and the process of washing it rendered simple, easy, and uniform.

Having thus described the nature, purposes, and operation of my invention, I claim, and desire to secure by Letters Patent of the United States, the following:

1. The side bars, D, applied adjustably to the housings E, in combination with the reciprocating feed-bars C, substantially as and for purposes stated.

2. In combination with the bars C, the toothed plate $q$, arranged over or above said bars, substantially as and for purposes stated.

3. The combination of the feed-bars C, the toothed plate $q$, arranged over or above said bars, and rollers $n\ o$, substantially as and for purposes stated.

JOHN PETRIE, JR.

Witnesses:
JOHN FIELDEN,
    *Sussex Street, Rochdale.*
JOHN DOWNHAM,
    38 *Spotland Road, Rochdale.*